N. H. BURHANS.
Wood Paper-Pulp Machinery.

No. 217,509.   Patented July 15, 1879.

Witnesses,
E. F. Benham,
D. B. Carver

Inventor,
NELSON H. BURHANS,
~by~
William H. Low,
Attorney.

UNITED STATES PATENT OFFICE.

NELSON H. BURHANS, OF RONDOUT, NEW YORK, ASSIGNOR OF ONE-HALF HIS RIGHT TO WILLIAM J. TURCK, OF SAME PLACE.

IMPROVEMENT IN WOOD-PAPER-PULP MACHINERY.

Specification forming part of Letters Patent No. 217,509, dated July 15, 1879; application filed June 13, 1879.

*To all whom it may concern:*

Be it known that I, NELSON H. BURHANS, of Rondout, in the county of Ulster and State of New York, have invented certain new and useful Improvements in Machinery for Preparing Stock for Wood-Paper-Pulp, of which the following is a full and exact description.

My invention relates to the cutter-heads used in wood-paper-pulp machines; and it consists in constructing said cutter-heads with several sections of detachable and adjustable teeth or cutters having angular faces, arranged as herein described, so that all the teeth moving in the same path will produce the same angularity of cut, while those moving in the adjoining path produce a cut of the reverse angularity.

Figure 1:
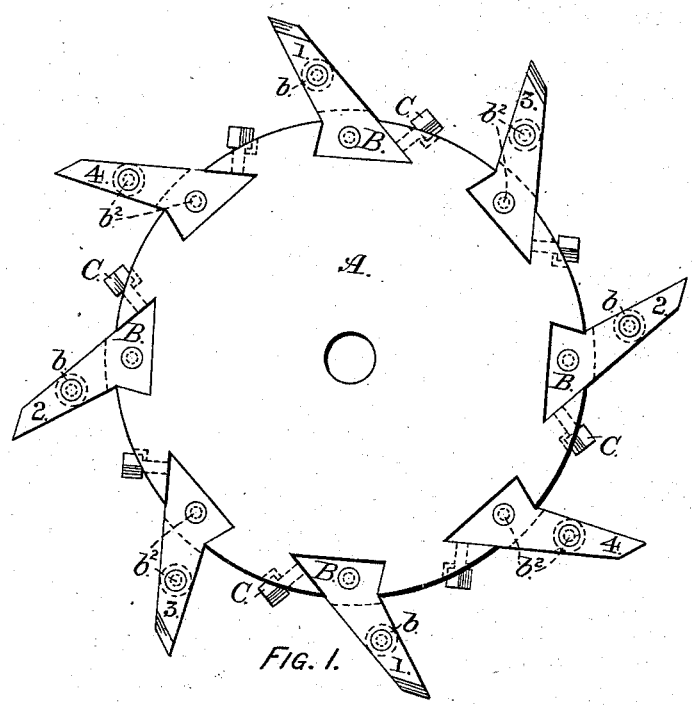
Figure 2:
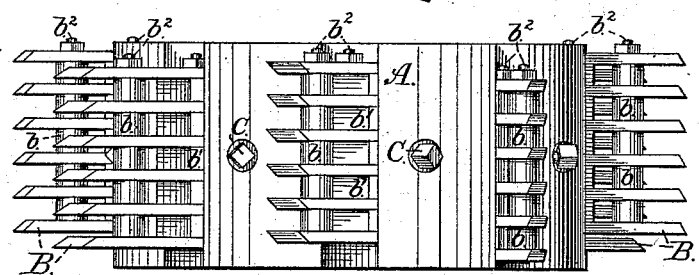
Figure 3:
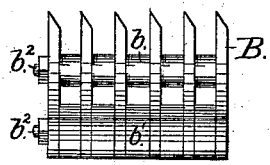

In the accompanying drawings, which form a part of this specification, and to which reference is herein made, Figure 1 is a side elevation of the cutter-head and teeth; Fig. 2, a plan view of same; Fig. 3, a front elevation of a section of the teeth detached from the head, and Fig. 4 an illustration of the series of teeth projected on a line to show the effect of the arrangement of the teeth.

As shown in the drawings, A is the cutter-head, made of a cylindrical form, and designed to be secured to a shaft having a rapid rotatory motion. Around the periphery of this head is a series of dovetailed grooves running directly across its cylindrical face and in line with its axial center, for the purpose of holding the sections of teeth; B, sections of teeth, consisting of separate teeth and spacing washers or collars $b$ and $b^1$, the latter being made to conform to the dovetailed base of the teeth where they fit into the dovetailed grooves of the cutter-head.

All the parts for each section are secured together by the bolts $b^2$, and each section is secured in place in its appropriate groove by a set-screw, C, or by any other suitable means.

All the teeth in each section have their beveled sides arranged in the same direction, and the said teeth are separated from each other by a space equal to about three times the thickness of each tooth.

The teeth of the several sections, as shown in the drawings, are arranged in such manner that when the cutter-head has made one-half of a revolution the teeth will have successively cut a width equal to the combined width of all the teeth; but it is obvious that this proportion of the revolution to the full width of the cut can be varied by increasing or diminishing the number of sections used in a cutter-head.

The teeth shown in the drawings bearing the same numerical designations are arranged to cut in the same path and at the same angle. All those bearing the even numbers have their angular faces arranged to cut at the same side, while those bearing the odd numbers cut at the opposite sides, and the effect of all of them combined is to cut a series of V-shaped grooves.

The chisel-edge sides of each set of teeth cutting the opposite angles of the same groove should be accurately adjusted in the same line, so as to make a clean cut and leave no ridge between them. The reverse or bevel side of the teeth should be made to slightly overlap the line of the teeth cutting the reverse bevel of the adjoining groove. By this means the liability to leave a standing ridge between the adjacent grooves is entirely avoided.

Figure 4:
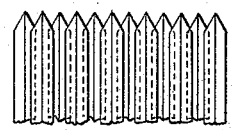

By arranging the teeth in the manner herein described, and as shown in Fig. 4, each one of the V-shaped grooves is made by two distinct cuts, thereby producing a more thorough disintegration of the wood than can be obtained by cutters making both sides of the V at the same time.

The cutter-head A is designed to be revolved in a frame-work, and the log from which the chips are cut is fed up to it in the usual manner.

I claim as my invention—

1. The cutter-head A, provided with a series of dovetailed grooves, as herein described, and having secured therein the detachable and adjustable cutter-sections B, composed of separate teeth, separated by the washers $b$ and $b^1$, and secured together by the bolts $b^2$, all constructed and arranged to operate as herein set forth.

2. The sections of detachable cutters B, composed of separate teeth, held apart by the washers $b$ and $b^1$, and secured together by the bolts $b^2$, in combination with a cutter-head provided with grooves for holding said sections, substantially as herein specified.

NELSON H. BURHANS.

Witnesses:
WM. J. TURCK, Jr.,
G. D. SCHERMERHORN.